Aug. 21, 1956     C. A. HIELLE     2,759,668
DIRECT READING EFFICIENCY INDICATOR
Filed July 16, 1953     2 Sheets-Sheet 1
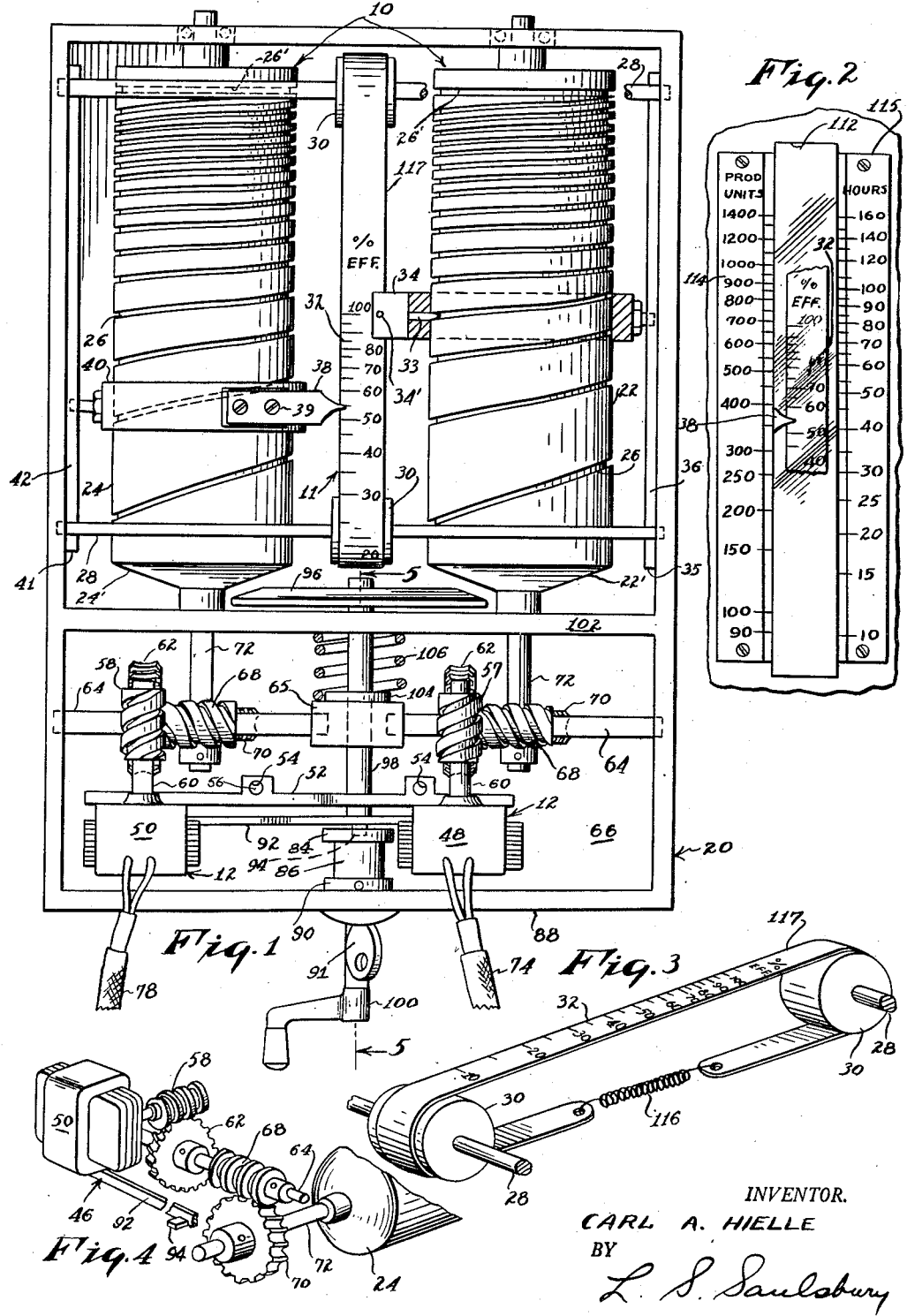
INVENTOR.
CARL A. HIELLE
BY
L. S. Saulsbury
ATTORNEY Aug. 21, 1956  C. A. HIELLE  2,759,668
DIRECT READING EFFICIENCY INDICATOR
Filed July 16, 1953  2 Sheets-Sheet 2
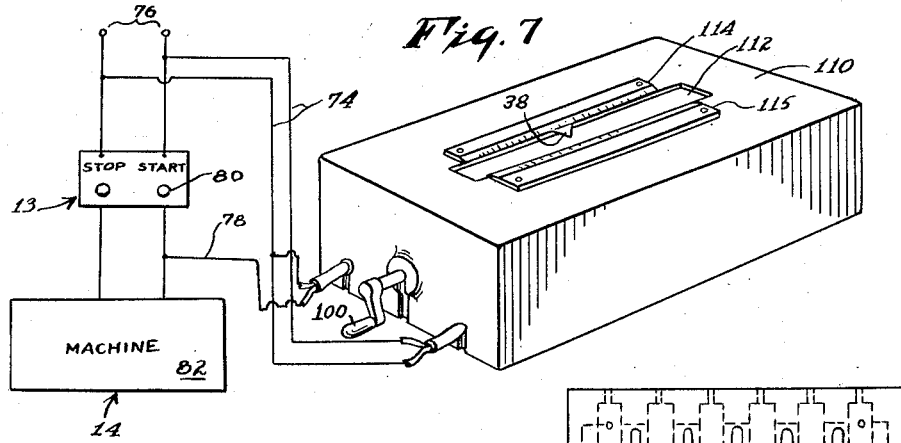
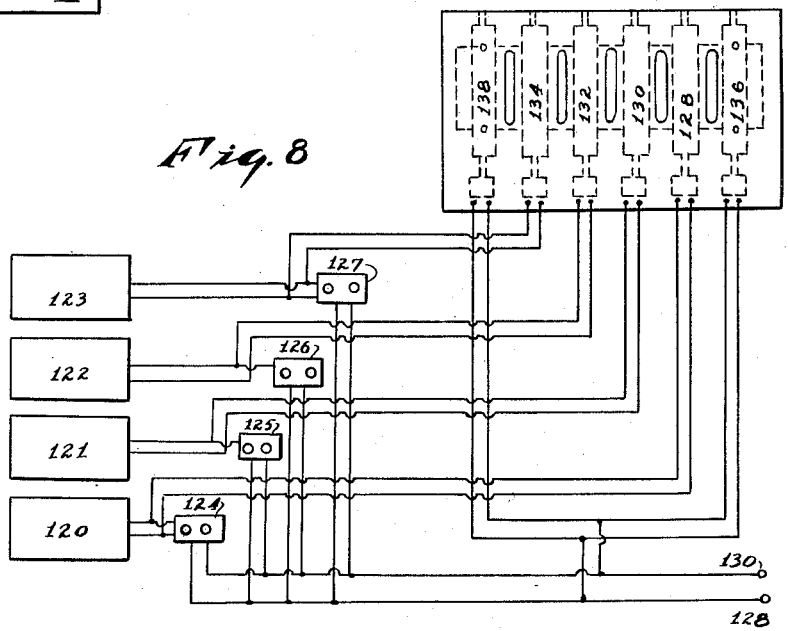
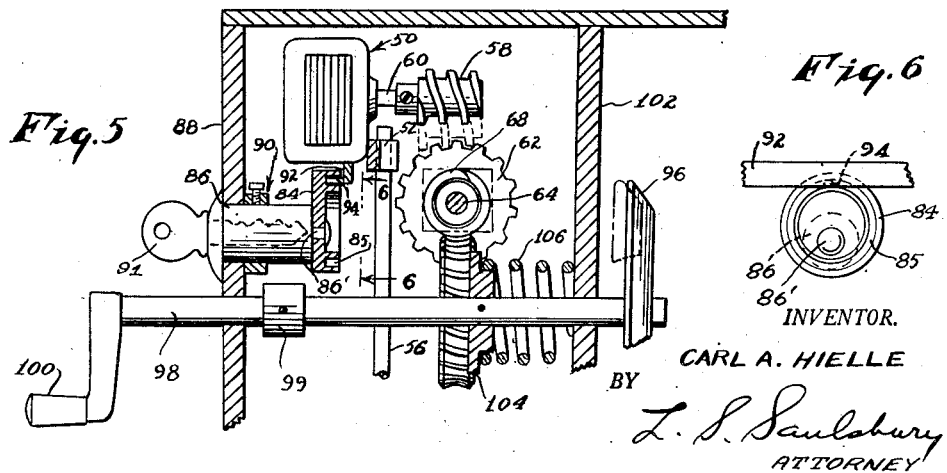
INVENTOR.
CARL A. HIELLE
BY
L. S. Saulsbury
ATTORNEY

United States Patent Office 2,759,668
Patented Aug. 21, 1956

2,759,668

DIRECT READING EFFICIENCY INDICATOR

Carl A. Hielle, Clifton, N. J.

Application July 16, 1953, Serial No. 368,480

4 Claims. (Cl. 235—61)

The present invention relates to metering instruments and relates more particularly to a metering device for visually indicating accumulated percentage values and other data on appropriately calibrated logarithmic scales.

An object of this invention is to provide an accurate visual meter capable of indicating the relative efficiency for the actual operating time cycle of the machine compared to the maximum operating cycle.

Another object of this invention is to provide a meter having correlated logarithmic scales on which the actual operating efficiency of a machine may be determined.

Still another object of the present invention is to correlate a constantly moving logarithmical scale with an intermittently moving logarithmical scale to indicate visually the mathematical product of machine efficiency.

Still another object of this invention is to determine visually through the use of appropriate metering device the idle non-productive time of an intermittently operated machine.

Still another object of the invention is to provide a meter in which the operating mechanism is substantially tamper proof and may be adjusted only by proper personnel.

A further object of the invention is to provide a visual index of operating facilities from which incentive schedules may be readily computed from directly interpolating from the operating efficiencies of an intermittently operated machine.

A still further object of this invention is to provide a simple means for connecting a series of machines with coordinated scales which function relative to a base index so that the idle time for productive machines may be indicated directly.

A still further object of this invention is to provide a directly indicating control meter capable of computing the machine production, efficiency, and other pertinent data of an intermittently operating production machine.

To determine the relative efficiency of a plant or individual machine, it is apparent that the optimum efficiency must be considered as the base index and the idle time or time delays must be measured to compute the actual operating time. The ratio of the actual operating cycle to the base index is a measure of the operating efficiency for an individual machine.

One embodiment of this invention contemplates the use of a constantly driven rotating drum on which is inscribed a logarithmic curve developed thereon. This drum provides the base index for the metering system. Mounted parallel to and in approximate relation to the constantly rotating drum is a similar drum, however, the driving means for this drum is connected to a production machine which is intermittently operated, thereby recording only the actual operating time. The intermittent operation of the production machine interrupts the operating cycle of the actual operating time drum so that a marker riding in the logarithmic curve will not progress as rapidly as the base index drum constantly rotating. However, by projecting the differential rates of movement of the indicia travelling in the logarithmic recesses on the drums on to a suitably calibrated lineally moving scale it is possible to read at any particular time the accumulated operating efficiency of the machine, and by suitable conversion factors, hours of operation, production units of similar results may be obtained directly.

Other objects and advantages of the present invention will become readily apparent to those skilled in the art from a consideration of the following general and detailed description of one embodiment of the present invention read in conjunction with the accompanying drawing in which the same reference numerals refer to the same or corresponding parts and wherein:

Figure 1 is a top plan view illustrating one embodiment of the present invention in which a cover plate is removed and cylindrical drums, cooperating scales and driving mechanisms are shown;

Fig. 2 illustrates an embodiment of an indicating scale affixed to a cover plate on the device of the present invention;

Fig. 3 is a perspective view of the indicating scale illustrated in Fig. 1;

Fig. 4 is a partial perspective view of a transmission driving assembly for one of the drums;

Fig. 5 is a sectional view of the transmission driving assembly and resetting mechanism taken substantially along the plane of line 5—5 of Fig. 1;

Fig. 6 is a view substantially along the plane of line 6—6 of Fig. 5;

Fig. 7 is a diagrammatic illustration of the present invention interconnected to a power source;

Fig. 8 is a diagrammatic illustration of a battery of meters interconnected to a series of operating production machines.

Referring to the accompanying drawings and more particularly to Fig. 1 wherein there is shown an instrument constructed in accordance with the present invention which generally comprises related rotatable metering drum devices 10, a calibrated scale 11 to indicate with associated indicia a differential rate of movement between the drum devices and separate driving motors 12 designed to drive the drum devices at a constant angular velocity. By interconnecting one of the driving motor devices 12 to a disconnect or similar switch 13 of an intermittently operated production machine such as machine 14, Fig. 7, the differential operating ration between the intermittently driven drum and the constantly driven drum may be recorded directly on suitably calibrated scale 11.

A base enclosure 20 provides an enclosing framework for a pair of parallel mounted cylindrical drums 22, 24 of the respective drum devices which are journaled to rotate within the base enclosure 20. The cylindrical drums 22, 24 respectively have similar cam grooves 26 recessed or grooved about the circumference of the drum developed thereon in the form of a logarithmic outline which will provide a logarithmic displacement to a lineally movable index associated with the logarithmic contour on the drum. Rotatably mounted substantially at the extremities of the rotatable drums 24, 25 are supporting dowel shafts 28, 28 on which are secured scale rollers 30, 30 over which a suitably calibrated scale 32 is placed to move lineally relative to the longitudinal axis of the drums 22, 24. Lineal movement of the scale 32 is imparted through the engagement of a cam follower lug 33. One end of the lug 33 is confined within the recess of the logarithmic groove 26 on the drum 22. The lug 33 is secured to the scale moving ring follower 34 surrounding the drum 22 and affixed at 34′ to the scale 32 to move the same. The other end of the follower 34 is guided in a slot 35 formed by longitudinally-extending ribs secured to a side wall laterally spaced from the drum 22.

Laterally spaced and parallel to the drum 22 is a similar drum 24 that is journalled to rotate in the same direction and to function with the companion drum 22. An indicating pointer 38 is fastened, as by screws 39, on pointer ring follower 40 with which a follower lug similar to lug 33, not shown, engages with the logarithmic recess 26 on the periphery of drum 24 to impart lineal movement to the pointer 38 over the scale 32.

The pointer follower 40 is restrained from skewing movement in a manner similar to the scale moving ring bracket 34, that is, through the use of a slot 41 formed by the longitudinal ribs 40 to fasten to the side wall of the enclosure adjacent the drum 24. The groove of the drum 24 will impart a logarithmic movement as well to the indicating pointer 38. It will thus be realized that the two movements described by the drums may be correlated as may be described herein to simulate a logarithmic sum of the relative motions of the drums with respect to each other and an appropriately calibrated scale 32 will furnish the requisite ratio of the relative rates of movement between the drums 22 and 24. Thus, it will be evident that the logarithmic grooves which projected upon a straight surface will have the relationship as represented by two logarithmic scales projected on the conventional slide rule.

Each cylindrical drum 22, 24 is rotated by an individual transmission system 46, as shown in Figs. 1 and 4, and is substantially similar to each other, so that explanation of one system will suffice to apprise one skilled in the art as to the operation of the other similar system for driving the other drum. Suitable constant speed electrical driving motors 48, 50 are securely mounted on the yoke 52 which is guided through the holes 54, 54 for vertical movement upon the vertical supporting rods 56, 56. Each motor drives a worm 58 fixed to the overhung armature shaft 60 to drive the worm gear 62 supported on the jackshaft 64 which is journaled in the side wall of the base enclosure 20 and a block 65 projecting from the rear wall 66 of the enclosure 20. The worm gear 62 imparts rotation to the worm 68 on the same shaft 64 to drive a worm gear 70 mounted on the prolongated shaft 72, protruding from the drum 22 or 24. As power is supplied from an electrical source through the electrical leads 74, the constant speed motor 48 will rotate the drum 22 at a constant rate of rotation through the transmission system 46.

Essentially, the operation of the drum 24 is similar to that of drum 22, however, as illustrated diagrammatically in Fig. 7, whereas the wires 74 lead directly from the power supply 76 to the motor 48 to drive it at a constant rate of rotation without a circuit disconnect interposed in the line, the circuit 78 is broken by having a starting switch 80 or similar circuit disconnect, connected in series with the motor 50 and will intermittently operate the machine 82 or similar production unit in accordance with the functioning cycle of the machine.

In order to provide a metering instrument that will indicate a true reading the calibrated drums must not be tampered with during an extended set up, therefore, the embodiment shown in Figs. 1 and 5 illustrates the use of a selectively releasable cam 84 having an annular recess 85 therein and eccentrically secured to the pin tumbler 86 by headed pin 86'. The tumbler 86 is inserted into and secured to the end wall 88 of the enclosure 20 by a collar and screw assembly 90. The tumbler 86 will be operated by a key 91.

Projecting from the cross bar 92 which interconnects the motors 48 and 50 is a lifting lug 94 engageable within the annular recess 85 of the cam 84. Since the cam 84 is eccentrically mounted rotation of the cam will raise or lower the cross bar 92 through the lifting lug 94, as shown in Figs. 4, 5 and 6. The motors 48 and 50 are fixed to the cross bar 92 and will be raised or lowered in accordance with the cam position. Tilting of the motors will be prevented by guidance offered through the drilled yoke 52 and rod 56.

Periodically, the cylindrical drums 22 and 24 must be reset to the starting positions to commence another cycle of operations. To facilitate resetting, the motors 48 and 50 together with their respective worms 57 and 58 must be separated from the worm gears 62 so that the drums 22, 24 may be free to rotate and be reoriented to their starting positions, and this function is imparted by the rotation of the releasing cam 84 as previously described. Rotation of the drums 22, 24 is imparted by the rotation of a frusto-conical friction plate 96 engaging the conical surfaces 22' and 24' on the ends of the cylindrical drums 22, 24, as shown in Fig. 1. The crank shaft 98 rotated by crank handle 100 is keyed to the friction plate 96 and journaled for rotation in the end wall 88 and intermediate wall 102 of the enclosure 20. The shaft 98 has a stop collar 99 to limit the outward movement of the shaft 98. Upon elevating the motors 48, 50 through rotation of the eccentrically mounted cam 84, the crank handle 100 may be moved axially to cause collar 104 to compress the spring 106 against the intermediate wall 102 of the enclosure 20 and thereby urge the friction plate 96 against end surfaces 22' and 24' of the respective rotatable drums 22, 24 and upon rotation of the crank handle 100 the drums may be returned to their initial or starting positions. Suitably positioned end stops (not shown) will limit movement of the lugs engaging the logarithmic grooves and thereby prevent further rotation of the drums 22, 24. Should one cylinder need to be returned to a greater extent than the other this is permitted by the slippage of the friction plate 96 upon the cylinder surfaces 22' and 24'. Release of the crank handle 100 and reverse rotation of the lock cam 84 will again place the instrument in readiness for the commencement of another cycle of operation. Each of the grooves 26 of the cylinders has a run out or endless portion 26' which serves as a safety feature to protect the instrument from damage, should the resetting be delayed in excess of the cylinder capacity.

An instrument cover 110 placed on the enclosure base 20 completely covers the external operating mechanism with the exception of the lineally moving scale and indicating pointer 38 both being visible through an elongated window aperture 112, as illustrated in Figs. 2 and 7. Appropriately calibrated stationary scales 114, 115 mounted laterally from the aperture 112 correlate the data as transposed from the moving scale 32 and pointing indicator 38. An embodiment of the moving scale 32 similar to that shown in Fig. 3 wherein the calibrated scale is shown on a flat belt 117 encircling the rollers 30, 30 and yieldingly retained thereon by a tension spring 116 engaging the ends of the belt 117. The scale 32 inscribed on the belt 117 is calibrated in percentage of efficiency and is a projection on a plane surface of part of the developed logarithmic curve on the rotating drums. The scale calibration of the belt 117 runs only from 10 to 100 per cent and therefore is only part of the scale calibration of either cylinder. The calibrations resemble the spacing appearing on conventional straight logarithmic slide rule scales. Laterally spaced fixed scales 114, 115 transpose in logarithmic form the accumulated operating period in hours for the intermittent drum 24 on scale 115 and for the total elapsed time opposite the 100 per cent mark of scale 32 or lug 33 as indicated by the continuous movement of drum 2, and the corresponding unit production scale 114 presumably produced for the period of machine operation.

The direct reading scale is best shown by illustrating a simple example. The follower 34 affixed to the moving scale is at the base index, 100 per cent efficiency, and the intermittent drum pointing indicator 38 is shown at 55 per cent. By considering the constantly rotating drum as the reference logarithmic scale, the lug 33 affixed to the bracket 34 and the moving scale 32 will be referred to as the index mark with the travelling pointing indicator 38 designated as the hairline marker. By manipulation of the scales as performed on the conventional slide rule, it will be readily appreciated that the multiplication of the two numbers is the sum of the two logarithms of the numbers and is equal to the logarithm of the product. That is log C=log A plus log B and log C=log AB or C=AB. By having the travelling index marker on the constantly rotating drum and the travelling index affixed to the lineally moving calibrated scale progressive multiplication occurs instantaneously at all points of operation so that when the index marker on the constantly rotating drum after 80 hours of continuous operation (considered as 100 per cent efficient) and the intermittently operating drum has operated only 44 hours the hairline marker or pointer 38 will indicate 55 per cent efficiency on the travelling scale at that instant in the cycle of operation.

This result will be appreciated by placing the slide scale index of a conventional slide rule over the digit 8 and by placing the slide hairline over the number 5.5, the product of 44 will appear on the same scale as the digit 8.

Fig. 8 illustrates a system in which a battery of machines 120 and 123 inclusive are each electrically connected through suitable switches 124 and 127 inclusive, respectively, to corresponding intermittently operated drums 128, 130, 132, and 134, respectively. Two reference index drums 136, 138 laterally spaced from each other to position the intermittently-operated drums therebetween support a suitably calibrated scale common for all the integrated drums. The intermittently operated drums 128, 130, 132, 134 are provided with indicating means similar to that illustrated in Fig. 1 to record the relative positions of each intermittently-operated drum. Transmission systems for each unit will resemble the transmission system utilized and described for the single complete system illustrated in Figs. 1 and 4.

Obviously, many modifications and variations of the present invention are possible in the light of the above teachings. It is, therefore, to be understood that within the scope of the appended claims the invention may be practiced otherwise than as specifically described.

What is claimed is:

1. A meter for directly indicating accumulated operating efficiencies comprising cylindrical drums rotatably mounted parallel to each other, each of said drums having a logarithmic recess developed about the circumference of each drum, a calibrated scale lineally moved by a cam follower lug riding in the recess of one of said drums, driving means for continually rotating said drum and said calibrated scale associated therewith, an indicator guided by a cam follower riding within the logarithmic recess of said other drum whereby said indicator is caused to move relative to said calibrated scale, and intermittent driving means for said other drum and the indicator associated therewith, said intermittent motion resulting from a failure of operation of a remote device connected to the driving means of said other drum.

2. A meter for directly indicating accumulated operating efficiencies comprising cylindrical drums rotatably mounted parallel to each other, each of said drums having a logarithmical recess developed about the circumference thereof, a calibrated scale lineally moved by a cam follower lug riding in the recess of one of said drums, gear driving means for continually rotating said one drum and said calibrated scale associated therewith, an indicator guided by a cam follower riding within the logarithmic recess of said other drum, whereby said indicator is caused to move relative to said calibrated scale, driving means for intermittently rotating said other drum with said indicator associated therewith, cam means to separate said gear driving means of both of said drums, and a friction clutch device engageable with the drums for manually resetting the drums to the starting positions when said gear driving means is separated.

3. A meter for directly indicating accumulated operating efficiencies comprising cylindrical drums rotatably mounted parallel to each other, each of said drums having a logarithmic recess developed about the circumference of each drum, a calibrated scale lineally moved by a cam follower riding in the recess of one of said drums, gear driving means for continually rotating said one drum with said calibrated scale associated therewith, an indicator guided by a cam follower riding within the logarithmic recess of said other drum, gear driving means for intermittently rotating said other drum with said indicator associated therewith whereby said indicator is caused to move relative to said calibrated scale, cam means to separate the gear driving means from said drums, selectively releasable locking means to release said cam from a locked position, and a disengageable friction clutch releasable into an operating position upon release of said cam from the locked position whereby the drums may be reset to their starting positions.

4. A meter for directly indicating accumulated operating efficiencies comprising a base enclosure and cylinders rotatably mounted parallel to each other within said base enclosure, each of said cylinders having a logarithmic recess developed on its circumference and a clutch surface at one of its ends, a movable scale journalled at its ends in said enclosure and lying parallel to and between said cylinders, an indicator operatively connected between the recess of one of said cylinders and the movable scale to lineally move the same, an indicator operatively connected to the recess of the other cylinder to be driven by the same, said indicator being operable over the movable scale whereby the movable scale may indicate the percentage of movement of the other cylinder relative to the one cylinder, the recess of each of said cylinders having a run out endless portion, an electric motor having drive gear means connected to the one cylinder to drive the same at a constant rate, a second electric motor and driving gear connected to the other cylinder to drive the same intermittently, a yoke supporting both of said electric motors and movable to elevate the electric motors out of engagement with their respective driving gear and to free the cylinders from rotation by said motors, lock means including a cam operably connected with said yoke and adapted to be locked to prevent the movement of said yoke except by the insertion of a key therein, a shaft having a crank therein extending from said base enclosure, a clutch plate on said shaft frictionally engageable with the conical end surfaces of said cylinders to effect the settings of said cylinders when said electric motors have been moved from the drive gear of the respective cylinders, and compression spring means associated with said crank shaft to effect the return of the clutch plate from engagement with the ends of said cylinders.

References Cited in the file of this patent

UNITED STATES PATENTS

| | | |
|---|---|---|
| 936,591 | White | Oct. 12, 1909 |
| 1,056,578 | Poole | Mar. 18, 1913 |
| 1,461,956 | Wood | July 17, 1923 |
| 1,678,009 | Leopold | July 24, 1928 |
| 1,725,617 | Castellani | Aug. 20, 1929 |
| 1,971,238 | Silling | Aug. 21, 1934 |

FOREIGN PATENTS

| | | |
|---|---|---|
| 627,729 | France | June 14, 1927 |
| 17,361 of 1928 | Australia | July 12, 1929 |
| 519,924 | Germany | Mar. 5, 1931 |
| 441,643 | Great Britain | Jan. 23, 1936 |